United States Patent
Hoke et al.

(10) Patent No.: US 10,598,084 B2
(45) Date of Patent: Mar. 24, 2020

(54) COOLING AND LUBRICATION SYSTEM FOR A TURBOCHARGER

(71) Applicant: BorgWarner Inc., Auburn Hills, MI (US)

(72) Inventors: Austin L. Hoke, Candler, NC (US); Frederick M. Huscher, Hendersonville, NC (US); Brock S. Fraser, Asheville, NC (US); Allen Stoner, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 104 days.

(21) Appl. No.: 15/921,187

(22) Filed: Mar. 14, 2018

(65) Prior Publication Data
US 2019/0284992 A1 Sep. 19, 2019

(51) Int. Cl.
*F02B 39/00* (2006.01)
*F01D 15/10* (2006.01)
(Continued)

(52) U.S. Cl.
CPC ............ *F02B 39/005* (2013.01); *F01D 15/10* (2013.01); *F01D 25/12* (2013.01); *F02B 37/10* (2013.01); *F02B 39/10* (2013.01); *F02B 39/14* (2013.01); *F04D 29/5806* (2013.01); *H02K 5/20* (2013.01); *H02K 7/083* (2013.01); *H02K 7/14* (2013.01);
(Continued)

(58) Field of Classification Search
CPC ........ F02B 39/005; F02B 37/10; F02B 39/10; F02B 39/14; F01D 15/10; H02K 5/20; H02K 7/083
See application file for complete search history.

(56) References Cited

U.S. PATENT DOCUMENTS

| 4,156,342 A | 5/1979 | Danko et al. |
| 5,605,045 A * | 2/1997 | Halimi .................... F01D 5/085 310/52 |

(Continued)

FOREIGN PATENT DOCUMENTS

| EP | 1222400 B1 | 12/2005 |
| FR | 2742606 A1 | 6/1997 |

(Continued)

*Primary Examiner* — Patrick D Maines
(74) *Attorney, Agent, or Firm* — Miller, Matthias & Hull LLP

(57) ABSTRACT

In a lubrication and cooling system for an electric machine operably driven by a turbine, a rotatable shaft may extend through an electric machine housing and a first and second bearing may be operably spaced apart from each other and coupled to the rotatable shaft. Furthermore, an electromagnetic rotor may be coupled to the rotatable shaft and disposed between the first and second bearings. A stator may be fixedly attached within the electric machine housing such that the electromagnetic rotor freely rotates along with the rotatable shaft. Additionally, a fluid passage defined in the electric machine housing delivers a portion of fluid to lubricate the first and second bearings and the remaining portion of fluid to circumferentially flow around the stator such that the fluid is in thermal communication with an outside surface of the stator to help maintain a desired operating temperature of the electric machine.

20 Claims, 6 Drawing Sheets

(51) Int. Cl.
*F02B 37/10* (2006.01)
*F02B 39/10* (2006.01)
*F02B 39/14* (2006.01)
*H02K 5/20* (2006.01)
*H02K 7/14* (2006.01)
*H02K 7/18* (2006.01)
*H02K 9/19* (2006.01)
*H02K 7/08* (2006.01)
*F01D 25/12* (2006.01)
*F04D 29/58* (2006.01)

(52) U.S. Cl.
CPC .............. *H02K 7/1823* (2013.01); *H02K 9/19* (2013.01); *F05D 2220/40* (2013.01); *F05D 2220/76* (2013.01); *F05D 2260/22141* (2013.01); *F05D 2260/98* (2013.01)

(56) References Cited

U.S. PATENT DOCUMENTS

| | | | |
|---|---|---|---|
| 6,032,459 A | 3/2000 | Skowronski | |
| 6,147,414 A | 11/2000 | McConnell et al. | |
| 6,169,332 B1 | 1/2001 | Taylor et al. | |
| 6,244,034 B1 | 6/2001 | Taylor et al. | |
| 6,257,834 B1 | 7/2001 | Bremer et al. | |
| 6,416,281 B1 | 7/2002 | Bremer et al. | |
| 6,710,479 B2 | 3/2004 | Yoshida et al. | |
| 6,793,466 B2 | 9/2004 | Miyamoto | |
| 6,814,537 B2 | 11/2004 | Olsen | |
| 6,965,183 B2 | 11/2005 | Dooley | |
| 7,056,103 B2 | 6/2006 | LaRue | |
| 7,126,313 B2 | 10/2006 | Dooley | |
| 7,140,848 B2 | 11/2006 | Jaisle | |
| 7,312,550 B2 | 12/2007 | Dooley | |
| 7,493,769 B2 | 2/2009 | Jangili | |
| 7,583,063 B2 | 11/2009 | Dooley | |
| 7,709,980 B2 | 5/2010 | Dooley | |
| 7,919,894 B2 | 4/2011 | Dooley | |
| 7,946,118 B2 | 5/2011 | Hippen et al. | |
| 7,948,105 B2 | 5/2011 | Agrawal et al. | |
| 8,584,459 B2 | 11/2013 | Richards | |
| 9,212,700 B1 | 12/2015 | Bucking et al. | |
| 9,401,630 B2 | 7/2016 | Garrard et al. | |
| 9,624,934 B2 | 4/2017 | Parker | |
| 9,638,203 B2 | 5/2017 | Bucking et al. | |
| 9,709,067 B2 | 7/2017 | Chekansky et al. | |
| 9,722,464 B2 | 8/2017 | Passman et al. | |
| 9,780,625 B2 | 10/2017 | Garrard et al. | |
| 2003/0075996 A1* | 4/2003 | Yoshida | H02K 1/20 310/58 |
| 2004/0179947 A1* | 9/2004 | Agrawal | F04D 17/12 417/212 |
| 2006/0225419 A1* | 10/2006 | Prusinski | F01D 25/18 60/605.1 |
| 2008/0087018 A1 | 4/2008 | Woollenweber | |
| 2008/0174190 A1* | 7/2008 | Kurata | H02K 1/18 310/54 |
| 2010/0175377 A1 | 7/2010 | Hippen et al. | |
| 2010/0284824 A1* | 11/2010 | Hippen | F01M 11/02 417/44.1 |
| 2014/0056721 A1 | 2/2014 | Garrard et al. | |
| 2015/0171689 A1 | 6/2015 | Wada | |
| 2015/0207386 A1 | 7/2015 | Garrard et al. | |
| 2016/0130976 A1 | 5/2016 | Bucking | |
| 2016/0258321 A1 | 9/2016 | Thompson et al. | |
| 2017/0082147 A1 | 3/2017 | Hager et al. | |
| 2017/0248070 A1 | 8/2017 | Heddy, III et al. | |

FOREIGN PATENT DOCUMENTS

| | | |
|---|---|---|
| GB | 2289576 B | 6/1996 |
| JP | 2000130176 A | 5/2000 |
| JP | 2003301799 A | 10/2003 |
| JP | 2006115731 A | 5/2008 |
| JP | 4811317 B2 | 11/2011 |
| WO | 0129426 A1 | 4/2001 |

* cited by examiner

COOLING AND LUBRICATION SYSTEM FOR A TURBOCHARGER

TECHNICAL FIELD

The present disclosure relates generally to turbochargers utilized to enhance internal combustion engine performance and, more particularly, to lubricating and cooling components of turbochargers.

BACKGROUND

Turbochargers are used to enhance performance of internal combustion engines that provide power to vehicles and other types of machinery. Turbochargers are typically centrifugal compressors driven by exhaust gas turbines that boost engine power, curtail emissions, and improve fuel economy. Rather than being belt-driven by the engine, as are superchargers, the typical turbocharger relies upon exhaust energy for its power, and as such is designed to rotate at speeds considerably higher than those of superchargers. Some turbochargers further include an electric machine, such as an electric motor or an electric generator, which drives and/or is driven by the exhaust gas turbine to assist the compressor during periods when insufficient exhaust energy is available to power the turbine or to generate additional electrical output utilized by the vehicle or machinery.

The challenges of satisfactorily lubricating and cooling turbochargers are well known by those skilled in the art. Turbochargers can rotate at speeds in excess of 100,000 rpm and therefore need lubrication for the rotating parts and cooling to remove heat generated by the rotating parts. Normally, different fluids are used to ensure adequate lubrication and cooling to the turbocharger. For example, turbochargers generally include a shaft configured to simultaneously drive or otherwise rotate the turbine wheel, compressor wheel, electric machine rotor and the like. The shaft includes a pair of spaced bearings located along its length, and the bearings are lubricated with oil or other such lubricant. Furthermore, the electric machine may be sensitive to prolonged exposure to temperatures of 200° C. and above and therefore requires cooling to maintain an acceptable operational temperature. As such, water or other coolant is circulated around the electric machine to conduct heat away from rotating components.

Use of multiple fluids for lubrication and cooling requires maintaining separate fluid sources and circulation systems. Such configuration increases turbocharger size and creates reliability and maintenance issues due to an increased number of fluid joints. As a result, modifications that allow a single fluid to be used for both lubrication and cooling will help with compliance to packaging requirements that continue to reduce physical spaces allotted to under-the-hood components including turbochargers. Additionally, elimination of separate fluids for lubrication and cooling will simplify the complexity of fluid circulation systems and assure continued reduction of turbocharger operational and maintenance costs.

SUMMARY OF THE DISCLOSURE

In one aspect of the present disclosure, a lubrication and cooling system for an electric machine operably driven by a turbine is disclosed. The lubrication and cooling system includes an electric machine housing defining an enclosure for the electric machine and a rotatable shaft extending through the electric machine housing along an axis. A first bearing and a second bearing are operably spaced apart from each other and coupled to the rotatable shaft. An electromagnetic rotor is additionally coupled to the rotatable shaft and disposed between the first and second bearings. The lubrication and cooling system further includes a stator fixedly attached within the electric machine housing and circumferentially surrounding the electromagnetic rotor such that the electromagnetic rotor freely rotates along with the rotatable shaft. Moreover, a fluid passage is defined within the electric machine housing and fluidly coupled to a fluid inlet, wherein a fluid flows through the fluid passage. A portion of the fluid may be directed to a first portion of the electric machine housing to lubricate the first and second bearings. The remaining portion of fluid may be directed into a second portion of the electric machine housing, the remaining portion of fluid circumferentially flows around the stator such that the fluid is in thermal communication with an outside surface of the stator to help maintain a desired operating temperature of the electric machine.

In another aspect of the present disclosure, an electric machine operably coupled to a turbocharger is disclosed. The electric machine includes an electromagnetic rotor operably coupled to a rotatable shaft and the rotatable shaft being driven by a turbine of the turbocharger. The electric machine further includes a stator circumferentially surrounding the electromagnetic rotor such that the electromagnetic rotor freely rotates along with the rotatable shaft. Moreover, a first bearing and a second bearing is operably spaced apart from each other and coupled to the rotatable shaft and the electromagnetic rotor and stator are disposed between the first and second bearings. An electric machine housing defining an enclosure for the electromagnetic rotor and stator and the electric machine housing is disposed between the turbine and a compressor of the turbocharger. The electric machine further includes a lubrication and cooling system having a stator cooling sleeve circumferentially surrounding and in thermal communication with an outer surface of the stator. A fluid passage is defined within the electric machine housing and fluidly coupled to a fluid inlet. Fluid flows through the fluid passage and a portion of the fluid is directed towards a first portion of the electric machine housing to lubricate the first and second bearings. Additionally, a remaining portion of the fluid is directed towards a second portion of the electric machine housing such that the remaining portion of fluid circumferentially flows around the stator cooling sleeve to help maintain a desired temperature of the stator during operation of the electric machine.

In a further aspect of the present disclosure, a turbocharger for receiving exhaust gas from an internal combustion engine, for delivering compressed air to the internal combustion engine and for driving an electric machine is disclosed. The turbocharger includes a turbine housing defining an enclosure for a turbine wheel and an electric machine housing coupled to the turbine housing and defining an enclosure for an electric machine that includes an electromagnetic rotor and a stator. The turbocharger further includes a rotatable shaft extending through the turbine housing and the electric machine housing. The turbine wheel and the electromagnetic rotor are operably coupled to the rotatable shaft and aligned along an axis such that rotation of the turbine wheel coincidently drives rotation of the electromagnetic rotor. A first bearing and a second bearing are operably spaced apart from each other and coupled to the rotatable shaft and the electromagnetic rotor and stator are disposed between the first and second bearings. The turbocharger further includes a stator cooling sleeve circumferentially surrounding and in thermal communication with an outer surface of the stator. Additionally, a fluid passage defined within the electric machine housing and fluidly coupled to a fluid inlet which receives a fluid from the common fluid source. The fluid flows through the fluid passage and a portion of the fluid is directed to a first portion of the electric machine housing to lubricate the first and second bearings. Moreover a remaining portion of the fluid is directed into a second portion of the electric machine housing and flows around the stator cooling sleeve to help maintain a desired temperature during operation of the electric machine.

The foregoing summary is illustrative only and is not intended to be in any way limiting. In addition to the illustrative aspects, embodiments, and features described above, further aspects, embodiments and features will become apparent by reference to the following drawings and detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are; therefore, not to be considering limiting of its scope, the disclosure will be described with additional specificity and detail through use of the accompanying drawings.

DETAILED DESCRIPTION

Figure 1:
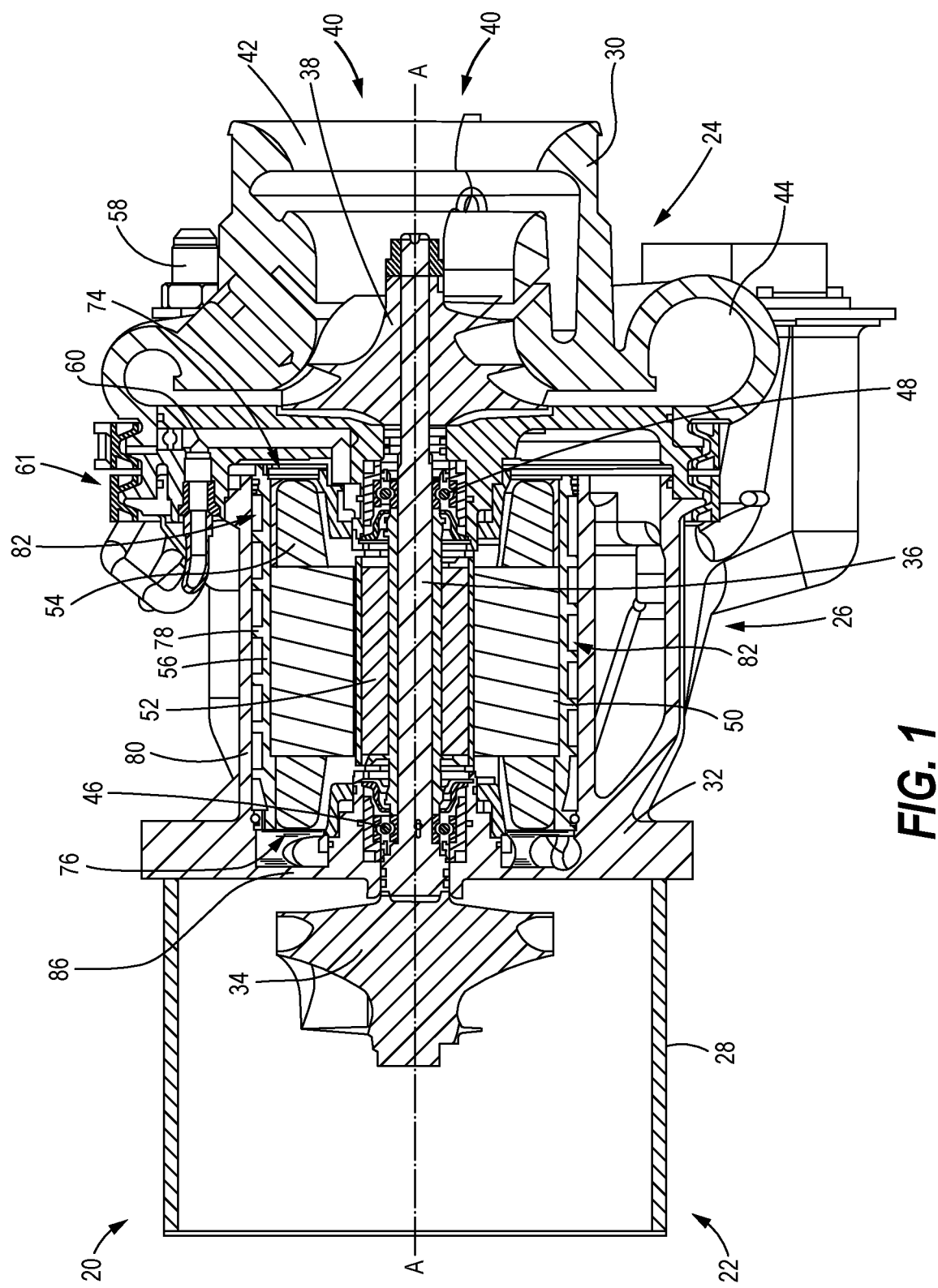
FIG. 1 is a side cross-sectional view of a turbocharger in which a lubrication and cooling system in accordance with the present disclosure may be implemented.

Referring to FIG. 1, a turbocharger 20 according to one embodiment generally includes a turbine portion 22, a compressor portion 24 and an electric machine portion 26 disposed there between. The exemplary turbocharger 20 further includes a turbine housing 28 at one end, a compressor housing 30 at an opposing end, and an electric machine housing 32 disposed between the turbine housing 28 and the compressor housing 30. The electric machine housing 32 may be attached to the turbine housing 28 and the compressor housing 30 using bolts, clamps, bands (e.g., v-bands), and/or other suitable fasteners. While the exemplary turbocharger 20 illustrated in FIG. 1 shows the electric machine portion 26 disposed between the turbine portion 22 and the compressor portion 24, it will be understood that other arrangements and configurations of the turbocharger 20 portions are possible.

The turbine housing 28 includes passageways for receiving high-energy exhaust gases from an engine manifold (not shown). Those skilled in the art will appreciate that the passageways direct the exhaust gases to a turbine wheel 34 mounted for rotation within the turbine housing 28. Moreover, the turbine wheel 34 is fixedly secured to one end of a rotatable shaft 36 that extends along a length of the turbocharger 20 from the turbine housing 28 through the electric machine housing 32 and into the compressor housing 30. As such, the rotatable shaft 36 is aligned along a turbocharger longitudinal and rotational axis A-A that defines a rotational axis of the rotatable shaft 36 and an axis that the housings 28, 30, 32 extend along and are disposed about when the turbocharger 20 is in an assembled state, as shown in FIG. 1.

A compressor wheel 38 is secured to an end of the rotatable shaft 36 opposite the turbine wheel 34 and is disposed within the compressor housing 30. The compressor wheel 38 is configured to compress incoming air that is received into the compressor housing 30 through an intake air inlet passage 42 (the direction of airflow of the intake air is denoted by arrow 40). The incoming air 40 is compressed within an annular passageway 44 (i.e., volute) in conventional fashion prior to exiting through a compressed air outlet and delivered to the engine (not shown). As such, those skilled in the art will appreciate that turbocharger power for compression of the incoming air 40 is initiated at the turbine wheel 34 that rotates the rotatable shaft 36 via the energy of the noted exhaust gases received by the turbine portion from the engine manifold (not shown).

To help facilitate rotation about the turbocharger longitudinal and rotational axis A-A, the rotatable shaft 36 is supported by first and second bearings 46, 48, such as but not limited to sleeve bearings, journal bearings, ball bearings or other such bearings. In one non-limiting example, the first and second bearings 46, 48 are axially spaced apart along the rotatable shaft 36 such that the first bearing 46 is located toward an end of the rotatable shaft 36 adjacent to the turbine portion 22 and the second bearing 48 is located toward an opposite end of the rotatable shaft adjacent to the compressor portion 24. Additionally, an electric machine 50, such as but not limited to, an electric motor, an electric generator, or the like, is operably mounted along the rotatable shaft 36 and disposed between the first and second bearings 46, 48. In at least one embodiment, the electric machine 50 is capable of acting as an electric motor (i.e., inputting rotational power to the rotatable shaft 36) or acting as an electric generator (i.e., extracting rotational power from the rotatable shaft 36). The electric machine 50 and first and second bearings 46, 48 are contained within the electric machine housing 32.

Generally, the electric machine 50 includes an electromagnetic rotor 52, such as but not limited to, a switched reluctance rotor, an induction rotor, a magnetic rotor that is coupled to and circumferentially surrounds the rotatable shaft 36. In other words, the rotatable shaft 36 extends through and is operably coupled to the electromagnetic rotor 52 such that the electromagnetic rotor 52 coincidently rotates along with the rotatable shaft 36. Additionally, a stator 54 circumferentially surrounds the electromagnetic rotor 52 and is fixed or otherwise secured within the electric machine housing 32 such that the stator 54 maintains a stationary and non-rotating orientation relative to the electromagnetic rotor 52. As further illustrated in FIG. 1, an embodiment of the electric machine 50 includes a stator cooling sleeve 56 that is radially exterior to the stator 54. As will be discussed in greater detail below, the stator cooling sleeve 56 circumferentially surrounds and is in thermal communication with an outer surface of the stator 54 to assist in maintaining a desired operational temperature of the stator 54 and other components during operation of the turbocharger 20.

In an embodiment, the electric machine 50 is configured as an electric generator which generates or produces electricity which may be utilized to power electric components of the machine or vehicle. Furthermore, the electric machine 50 may be coupled to an electricity storage device (not shown), such as but not limited to a battery, capacitor or other electricity storage device, so the electricity generated by the electric machine 50 is stored and used when needed. As discussed above, heat and/or exhaust energy is produced by heat generators such as but not limited to, the combustor included in an internal combustion engine, a Brayton cycle engine or other such engine, the vaporized working fluid used in a Rankine cycle steam turbine and other such heat and/or exhaust energy producers. As such, the generated heat and/or exhaust acts on the turbine wheel 34 to rotate the rotatable shaft 36. In turn, the rotatable shaft 36 simultaneously rotates the electromagnetic rotor 52 of the electric machine 50 to generate electricity and the compressor wheel 38 to compress incoming air delivered to the engine intake (not shown).

Additionally or alternatively, an embodiment of the electric machine 50 is configured as an electric motor which helps drive the compressor wheel 38 during period of insufficient available exhaust to adequately power the turbine wheel 34 and subsequent rotation of the rotatable shaft 36. Furthermore, in the electric motor configuration the electric machine 50 can be used to drive other components of the vehicle or machine, as needed. In such embodiments, the electric motor can extract energy from the above-described a battery, capacitor or other electricity storage device. In at least one embodiment, a controller (not shown) can control the flow of electrical energy between the electric machine 50 and the above-described a battery, capacitor or other electricity storage device to control operation of the electric machine 50 as an electric motor or as an electric generator. For example, such a controller could, at certain times, direct electrical energy from the above-described a battery, capacitor or other electricity storage device to the electric machine 50 such that the electric machine 50 acts as an electric motor and could, at certain other times, direct electrical energy from the electric machine 50 to the above-described a battery, capacitor or other electricity storage device such that the electric machine 50 acts as an electric generator.

During normal operation of the turbocharger 20, the rotatable shaft 36 rotates at a high rate. In some applications, the turbocharger 20 and its rotating components can rotate at 100,000 rpm or more. Such high rotation rates can generate a significant amount of friction, heat, and other such operational by-products that require adequate lubrication and cooling. As a result, a lubricating fluid (e.g., oil) is circulated through portions of the turbocharger 20 to lubricate various rotating components of the turbocharger 20. In one non-limiting example, a fluid inlet 58 delivers fluid to a fluid passage 60 defined within the electric machine housing 32.

At least a portion of the lubricating fluid flows through the fluid passage 60 to the bearings 46, 48. As illustrated in FIG. 1, the bearings 46, 48 are contained within the electric machine housing 32 and arranged axially exterior to the electromagnetic rotor 52 and stator 54 of the electric machine 50. As such, fluid (e.g., oil) used to lubricate the bearings 46, 48 is delivered in close proximity to the electric machine 50.

Therefore, some embodiments of the turbocharger 20 may have a lubrication and cooling system 61 that uses a common fluid source (not shown) for both lubrication and cooling purposes. In one non-limiting example, the fluid passage 60 diverts at least a portion of the fluid that enters through the fluid inlet 58 to a portion of the electric machine housing 32 adjacent to the rotatable shaft 36 to lubricate the bearings 46, 48. Additionally, a remaining portion of fluid can be diverted to a portion of the electric machine housing 32 adjacent to the stator 54 to help cool and maintain a desired operational temperature of the electric machine 50.

Figure 2:
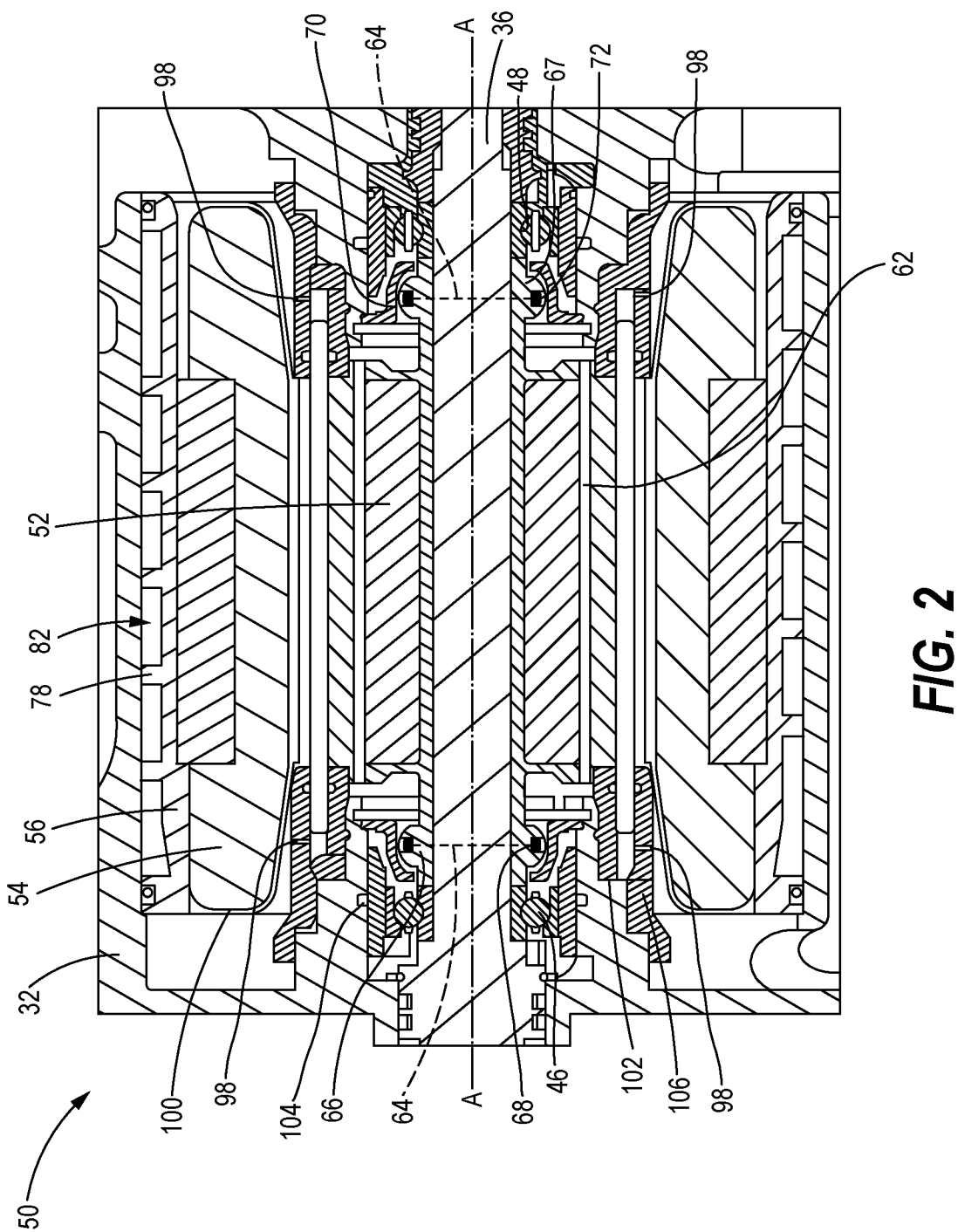
FIG. 2 is an enlarged side cross-sectional view of a portion of the turbocharger of FIG. 1 where an electric machine is mounted to within an electric machine housing.

Referring now to FIG. 2, an enlarged portion of the electric machine 50 including the bearings 46, 48, rotatable shaft 36, electromagnetic rotor 52, stator 54 and other such components contained within the electric machine housing 32 is illustrated. As discussed above, the electromagnetic rotor 52 is operably coupled to the rotatable shaft 36 and rotates coincidently along with the rotatable shaft 36 during turbocharger 20 operation. Moreover, the stator 54 is positioned radially exterior and circumferentially surrounds the electromagnetic rotor 52. Furthermore, the stator 54 is generally fixed within the electric machine housing 32 such that the stator 54 is stationary relative to the electromagnetic rotor 52 and rotatable shaft 36. As such, the stator 54 is spaced a radial distance away from the electromagnetic rotor 52 to define an air gap 62 between the electromagnetic rotor 52 and stator 54. The air gap 62 dimensions are configured based on desired operational parameters of the electric machine 50. Additionally, the air gap 62 defines an area of non-contact between the electromagnetic rotor 52 and stator 54 which permits unobstructed rotation between the two structures of the electric machine 50.

However, in some cases, the rotation of the rotatable shaft 36 and electromagnetic rotor 52 can draw in or otherwise pump lubricating fluid from the bearings 46, 48 into the electric machine 50. More specifically, when fluid infiltrates the air gap 62 the fluid can degrade performance, efficiency, durability and other operational characteristics of the electric machine 50 due to windage loss, shear loss and other such performance degradations. Additionally, the rotation of the electromagnetic rotor 52 generates heat which can overheat fluid within the air gap 62. Overheated fluid can leave deposits or other debris on the electromagnetic rotor 52 and stator 54 that negatively impact operation and performance of the electric machine 50.

As a result, a fluid barrier 64 is defined in some embodiments of the electric machine 50 to reduce the amount of fluid drawn into the air gap 62 between the electromagnetic rotor 52 and stator 54. The fluid barrier 64 forms a fluid tight seal between the bearings 46, 48 and the electromagnetic rotor 52 such that fluid and other debris is kept out of air gap 62 between the electromagnetic rotor 52 and stator 54. The fluid barrier 64 includes a seal mount 66 which extends radially from the surface of the rotatable shaft 36 and receives a sealing element 68 (e.g., O-ring, gasket, piston ring, labyrinth seal, and/or other such contact and non-contact sealing elements). Furthermore, the seal mount 66 positions the sealing element 68 to sealingly engage with an interior sealing surface 70 of the electric machine housing 32 to form the fluid tight seal. As illustrated in FIG. 2, the seal mount 66 is integral with the rotatable shaft 36 such that the seal mount 66 and rotatable shaft 36 form a unitary component. The seal mount 66 defines a seal mounting portion 72 such as an annular groove and the sealing element 68 seated within the seal mounting portion 72. Alternatively, it will be understood that the seal mount 66 can be formed by a separate component that slides over the rotatable shaft 36 and is fixedly coupled to the rotatable shaft 36 using a clearance fit, an interference fit, and/or other such coupling method.

As noted above, in addition to using fluid to lubricate the bearings 46, 48, some embodiments of the turbocharger 20 also use the same fluid provided from a common fluid source (not shown) to help maintain a desired operational temperature (or temperature range) of the electric machine 50. Heat is generated by the high revolution count (e.g., >50,000 rpm) of the rotatable shaft 36 and electromagnetic rotor 52, hot gas proximate to the turbine wheel 34 and turbine housing 28 that is transmitted to the rotatable shaft 36, and by electrical resistance in the stator 54 of the electric machine 50. This generated heat can increase the temperature of the electric machine 50. In some cases, excessive heat build-up within the electric machine housing 32 can degrade performance of the electric machine 50. As such, in an embodiment of the turbocharger 20, the fluid inlet 58 shown in FIG. 1 provides a common fluid supply which both lubricates the bearings 46, 48 and cools the stator 54 and other temperature sensitive components of the electric machine 50 and turbocharger 20. In one non-limiting example, the electric machine 50 includes a stator cooling sleeve 56 disposed around the exterior surface of the stator 54.

Figure 3:
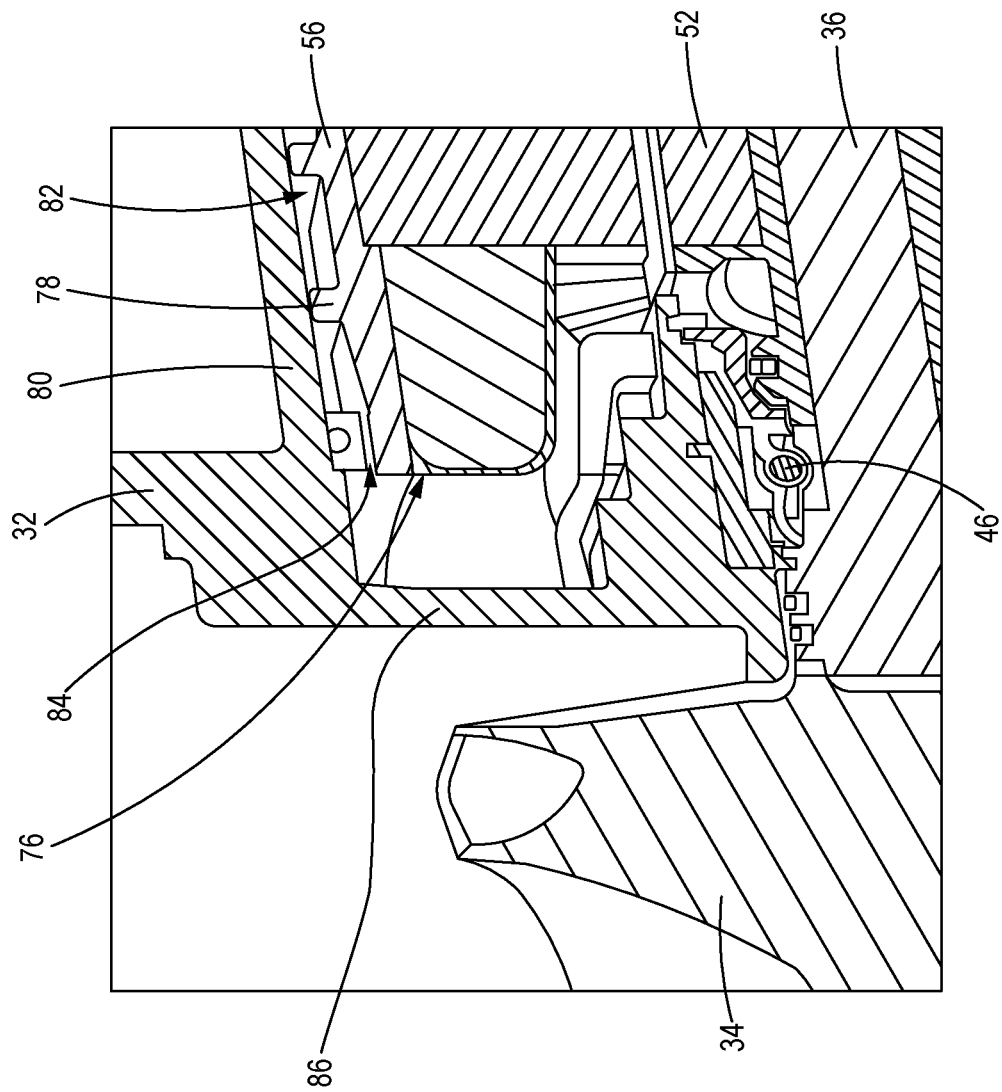
FIG. 3 is a partial assembly isometric view of an electric machine housing, an electric machine, and a turbine in accordance with an embodiment of the present disclosure of the turbocharger of FIG. 1.

Referring to FIG. 3, with continued reference to FIG. 1, an embodiment of the turbocharger 20 incorporates the stator cooling sleeve 56 to provide adequate cooling for the electric machine 50. In one non-limiting example, the stator cooling sleeve 56 slides over the stator 54 and is in direct contact with the exterior surface of the stator 54. The direct contact between the stator 54 and stator cooling sleeve 56 establishes thermal communication between the two structures such that heat is drawn away from the stator 54 by the stator cooling sleeve 56. The stator cooling sleeve 56 includes open ends 74, 76 at opposing axial ends of the stator cooling sleeve 56. Furthermore, the stator cooling sleeve 56 includes one or more cooling fins 78 that radially extend from the outer surface of the stator cooling sleeve 56. As illustrated in FIG. 1, the cooling fin 78 axially extends between the stator cooling sleeve 56 and the inner surface of a transverse wall 80 of the electric machine housing 32. The cooling fin 78 extends adjacently to, or in some cases in direct contact with, the inner surface of the transverse wall 80 to define a cooling fluid pathway 82 for fluid to travel through.

In some embodiments, the one or more cooling fins 78 wrap around the outer surface of the stator cooling sleeve 56 in a corkscrew or helical pattern. As a result, the cooling fluid pathway 82 extends from one end to the opposite end of the stator cooling sleeve 56 (in the direction of the longitudinal axis A-A) and travels around the outer surface of the stator cooling sleeve 56 (around the longitudinal axis A-A) according to the corkscrew or helical pattern. In one non-limiting example of the stator cooling sleeve 56 illustrated in FIG. 1, the cooling fin 78 continuously wraps around the stator cooling sleeve 56 to define the cooling fluid pathway 82 as a continuous passage. The cooling fluid pathway 82 receives fluid (e.g., oil or other coolant) from the fluid passage 60 and the fluid flows through the cooling fluid pathway 82. In so doing, the fluid moves axially along the outer surface of the stator cooling sleeve 56 from one end of the stator cooling sleeve 56 adjacent to the compressor portion 24 to the opposing end of the stator cooling sleeve 56 adjacent to the turbine portion 22. The fluid movement of along the outer surface of the stator cooling sleeve 56 promotes cooling of the stator 54 and other components of the electric machine 50 due to the fluid absorbing heat that is pulled out of the electric machine 50 by the stator cooling sleeve 56. It will be understood that the movement of fluid is not restricted to a particular flow pattern. Rather, the cooling fluid pathway 82 may be alternately configured such that fluid flows from the end of the stator cooling sleeve 56 adjacent to the turbine portion 22 towards the end of the stator cooling sleeve 56 adjacent to the compressor portion 24.

Referring to FIG. 3, an embodiment of the stator cooling sleeve 56 includes one or more fluid jets 84 formed at the end of the stator cooling sleeve 56 adjacent to the turbine portion 22. The one or more fluid jets 84 are arranged in a perpendicular orientation relative to a wall 86 of the electric machine housing 32 that is adjacent to a wall of the turbine housing 28. As such, as the fluid flows through the cooling fluid pathway 82 and exits through the one or more fluid jets 84, the fluid is directed onto the wall 86 of the electric machine housing 32. The fluid directed onto the wall 86 flows along the wall 86 (e.g., due to gravitational forces) and helps cool the electric machine housing 32. As mentioned above, the fluid enters the cooling fluid pathway 82 at the end of the stator cooling sleeve adjacent to the compressor portion 24 and the fluid flows longitudinally along the stator cooling sleeve 56. In some embodiments, the one or more fluid jets 84 may include specific dimensions which restrict or otherwise control the overall fluid flow through the cooling fluid pathway 82. Additionally, the one or more fluid jets 84 may serve as the main exit for the fluid which flows through the cooling fluid pathway 82 defined on the stator cooling sleeve 56; however, other exits or drains for the fluid may be defined as needed. Furthermore, it will be understood that placement of the one or more fluid jets 84 is not limited to the end of the stator cooling sleeve 56 adjacent to the turbine portion 22. Consequently, the one or more fluid jets 84 can be placed at the end of the stator cooling sleeve 56 adjacent to the compressor portion 24 and fluid enters the cooling fluid pathway 82 at the end of the stator cooling sleeve 56 adjacent to the turbine portion 22 and flows towards the opposite end of the stator cooling sleeve 56 and exits through the one or more fluid jets 84 adjacently arranged to the compressor portion 24.

Figure 4:
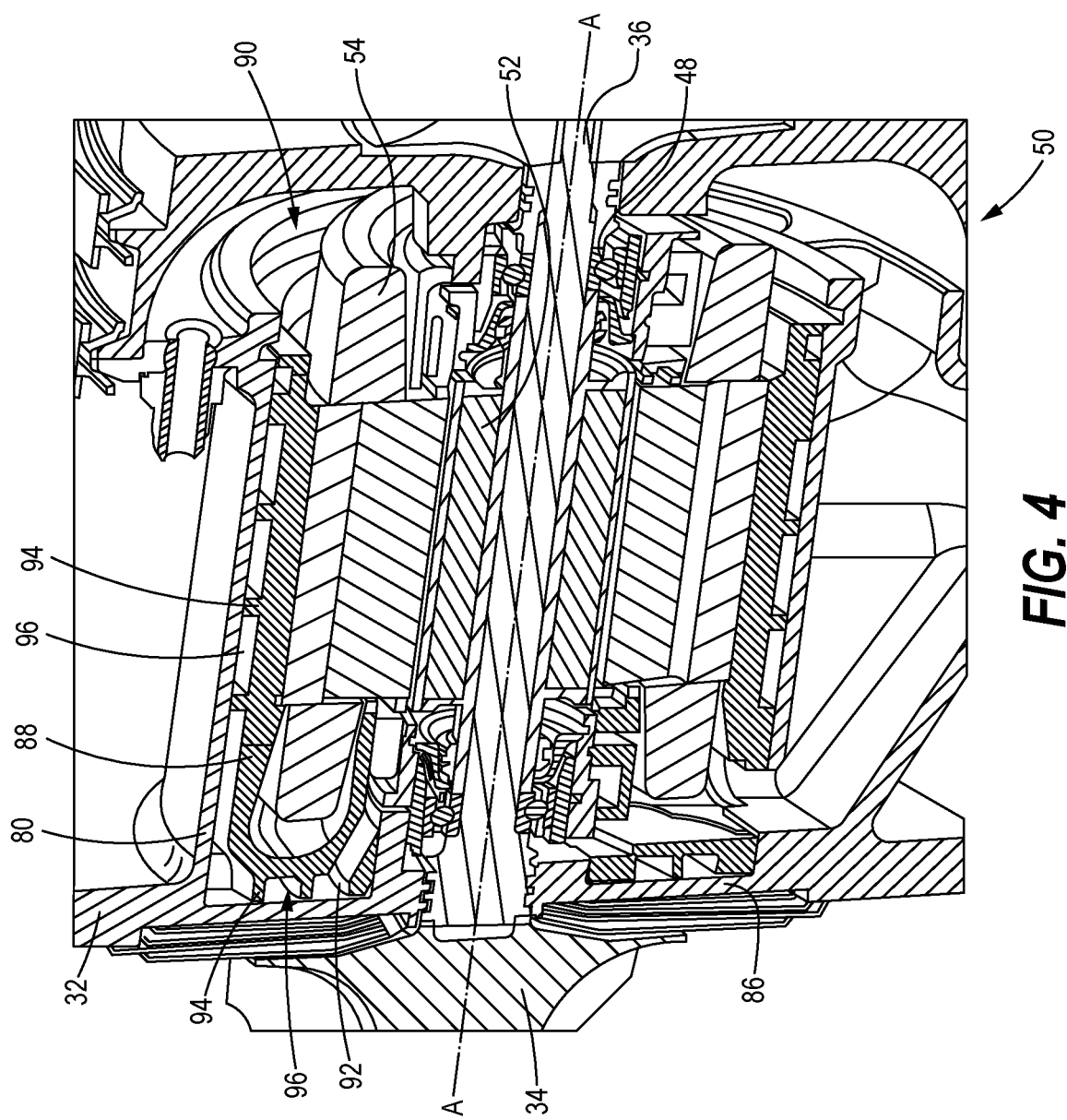
FIG. 4 is an isometric view of a partial cross-section of an embodiment of the lubrication and cooling system, the electric machine housing and the electric machine in accordance with an embodiment of the present disclosure.

FIG. 4 illustrates an alternative embodiment of a stator cooling sleeve 88 which may be incorporated with the turbocharger 20 of FIG. 1. The stator cooling sleeve 88 circumferentially surrounds and is in thermal communication with the outer surface of the stator 54. The stator cooling sleeve 88 conducts or otherwise pulls heat away from the stator 54, rotor 52 and other components to help maintain a desired operating temperature during turbocharger 20 (FIG. 1) operation. The stator cooling sleeve 88 includes one open end 90 and one closed end 92 that wraps around an axial end of the stator 54. Furthermore, the stator cooling sleeve 88 includes one or more cooling fins 94 that extend away from the outer surface of the stator cooling sleeve 88 towards the transverse wall 80 of the electric machine housing 32. In some embodiments, the one or more cooling fins 94 are adjacent to, or in some cases in direct contact with, the inner surface of the transverse wall 80 and define a cooling fluid pathway 96 for fluid or other such coolant medium to flow through. Similar to the stator cooling sleeve 56 discussed above, the one or more cooling fins 94 wrap around the outer surface of the stator cooling sleeve 88 according to a corkscrew or helical pattern. Additionally, one or more cooling fins 94 are included on the closed end of the stator cooling sleeve 88. As a result, the cooling fluid pathway 96 extends from one end to the opposite end of the stator cooling sleeve 88 and travels around the outer surface of the stator cooling sleeve 88 according to the corkscrew or helical pattern.

The one or more cooling fins 94 on the closed end 92 of the stator cooling sleeve 88 direct the cooling fluid pathway 96 to continue onto the closed end 92 of the stator cooling sleeve 88. Accordingly, fluid flows axially along the outer surface of the stator cooling sleeve 88 from the open end 90 towards the closed end 92 of the stator cooling sleeve 88. Once the fluid reaches the closed end 92, the fluid follows the cooling fluid pathway 96, which continues onto the closed end 92 of the stator cooling sleeve 88, and circulates around the closed end 92 of the stator cooling sleeve 88. As a result, the stator cooling sleeve 88 provides cooling to the stator 54 as well as to the wall 86 of the electric machine housing 32 adjacent to the turbine portion 22 of the turbocharger 20. Such cooling ability can help maintain the desired operating temperature within the electric machine housing 32 because not only does rotation of the electromagnetic rotor 52 generate heat but heat generated by turbine wheel 34 rotation can be conducted through the turbine housing 28 to increase the temperature within the electric machine housing 32 as well.

Referring back to FIG. 2, with continued reference to FIG. 1, an embodiment of the electric machine 50 including cooling features is illustrated. As discussed above, the electric machine includes the electromagnetic rotor 52 and the stator 54, and the electromagnetic rotor 52 is operably coupled to and rotates with the rotatable shaft 36 during turbocharger 20 operation. During normal operation, the rotatable shaft 36 and the electromagnetic rotor 52 may rotate at 100,000 rpm or more. Such high rotation rates can generate a significant amount of friction, heat and other such characteristics which require lubrication and cooling of components. As previously noted, lubricating fluid (e.g., oil) is circulated through portions of the turbocharger 20 to lubricate various rotating components of the turbocharger 20. In one non-limiting example, the fluid inlet 58 delivers fluid (e.g., oil) to the fluid passage 60 and at least a portion of the lubricating fluid flows is used to lubricate bearings 46, 48. In some embodiments, the turbocharger 20 may use the fluid for additional purposes such as but not limited to, cooling one or more components to maintain a desired operating temperature of the electric machine 50 and other turbocharger 20 components.

As further illustrated in FIG. 2, an embodiment of the electric machine 50 includes one or more fluid jets 98 which direct fluid (e.g., oil) onto end turns 100 of the stator 54 to provide cooling for the electric machine 50. For example, fluid is collected in a fluid plenum 102 from the fluid passage 60. The fluid plenum 102 is in fluid communication with a bearing feed 104 which delivers fluid to lubricate the bearings 46, 48. Additionally the fluid plenum 102 is in fluid communication with the one or more jets 98 that spray fluid on the stator end turns 100 to cool the stator 54 during operation of the turbocharger 20. As such, a common fluid supply is utilized to provide lubrication to the bearings 46, 48 as well as cooling to the stator 54 and other components of the electric machine 50.

In one non-limiting example, the one or more jets 98 are formed in an electric machine sleeve 106 which is axially and radially exterior to the electromagnetic rotor 52, and the one or more jets 98 are adjacently positioned with the stator 54 such that fluid directed through the jets 98 splashes, impinges, or otherwise wets a portion of the stator 54. Moreover, in an embodiment, the electric machine sleeve 106 is incorporated into the electric machine housing 32. The fluid is directed through the jets 98 to splash the exposed stator end turns 100 to cool or otherwise maintain operational temperature of the stator 54 during operation. The electric machine sleeve 106 allows the one or more jets 98 to be customized to provide a desired amount of cooling to the stator 54. Furthermore, the electric machine sleeve 106 can be fabricated from metal, plastic, composite, ceramic, or other such material. In one non-limiting example, the electric machine sleeve 106 is made from a high temperature resistant and electrically insulating plastic or composite material to minimize eddy current flow between the stator 54 and electric machine sleeve 106. Such current flow may be present between conductors that are placed in close proximity to each other. In this case, the electric machine sleeve 106 and the stator 54 are adjacently positioned and the eddy current between the two could generate additional heat during electric machine 50 operation.

Figure 6:
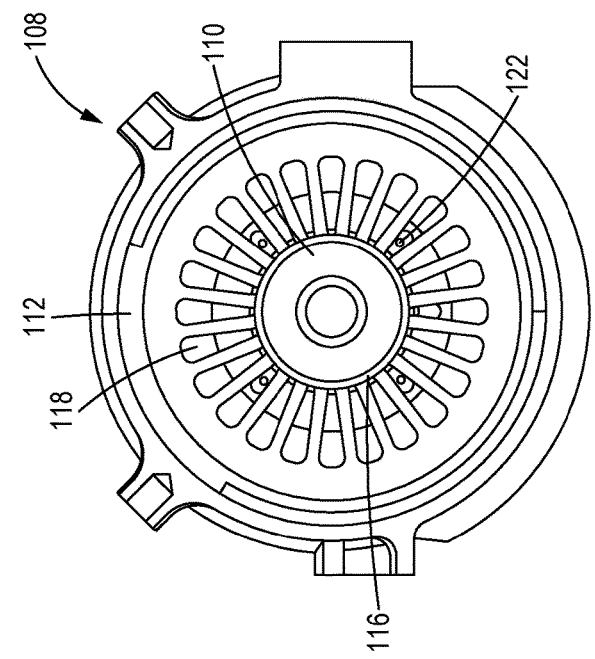
FIG. 6 is an end view of the stator of FIG. 5, in accordance with the present disclosure.
Figure 5:
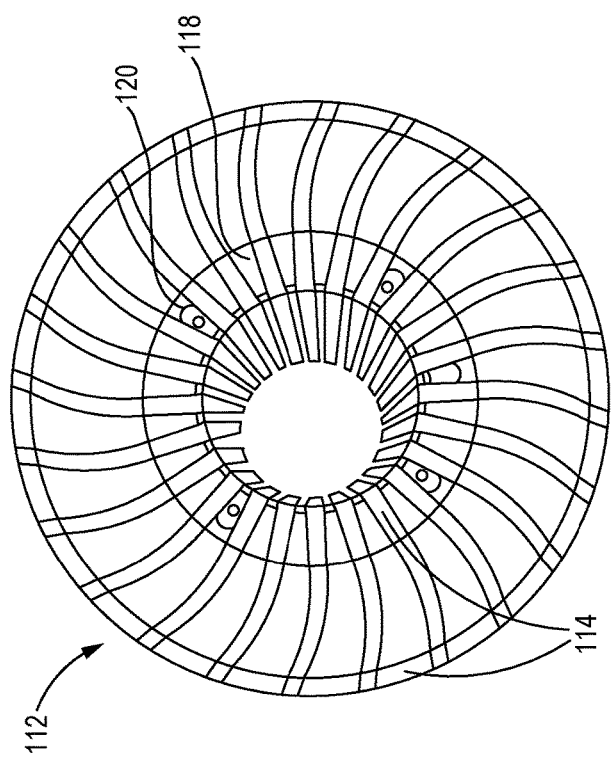
FIG. 5 is a plan view of an alternative embodiment of a stator in accordance with the present disclosure.
Figure 7:
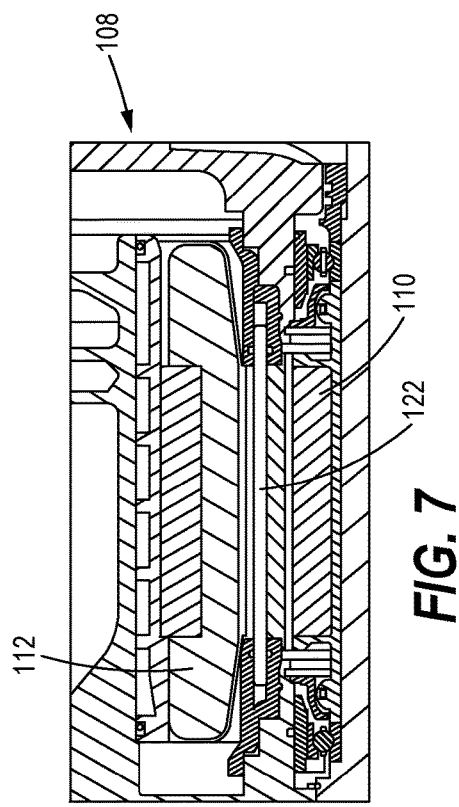
FIG. 7 is a partial cross-sectional view of the alternative embodiment of the stator of FIGS. 5 and 6, in accordance with the present disclosure.

Referring to FIGS. 5-7, an exemplary electric machine 108 that includes an electromagnetic rotor 110 and an encapsulated or potted stator 112 is illustrated. In some embodiments, the stator 112 is encapsulated in potting material 114 such as an epoxy or other similar material to help regulate temperature of the stator 112 during operation. As such, the potting material 114 should have good thermal conductivity to help draw heat away from the stator 112 and the potting material 114 should be able to withstand the elevated operating temperatures (i.e., 200° C.) of the electric machine 108. Additionally, encapsulating the stator 112 with potting material 114 helps to minimize fluid (e.g., oil) ingress into the electric machine 108 during operation.

Similar to the stator 54 illustrated in FIG. 1 and discussed above, the stator 112 surrounds the electromagnetic rotor 110. In an embodiment of the electric machine 108, a rotor cavity 116 surrounding the electromagnetic rotor 110 is at least partially exposed which allows fluid to enter from various sources. Furthermore, the stator 112 includes a plurality of slots 118 and these slots may fill with fluid which enters the rotor cavity 116. As a result, the stator 112 is encapsulated with the potting material 114 to fill in the slots 118 and prevent fluid from draining and flowing through them. However, in some embodiments, it is not desired to completely fill in all the slots 118 with potting material 114. For example, referring to FIG. 5, the potting material 114 in some slots 118 can be molded to define a stator channel 120 within the potting material 114 of the stator 112. In one non-limiting example, at least one slot 118 is molded to define the stator channel 120 and provide a drainage pathway for fluid that enters the rotor cavity 116. Additionally, one or more of the stator channels 120 can include a fluid feed tube 122 that extends along at least a portion of the length of the stator 112. In some embodiments, the fluid feed tube 122 is used to transport fluid between bearings 46, 48 (FIGS. 1 and 2) or other component of the electric machine 108.

Figure 8:
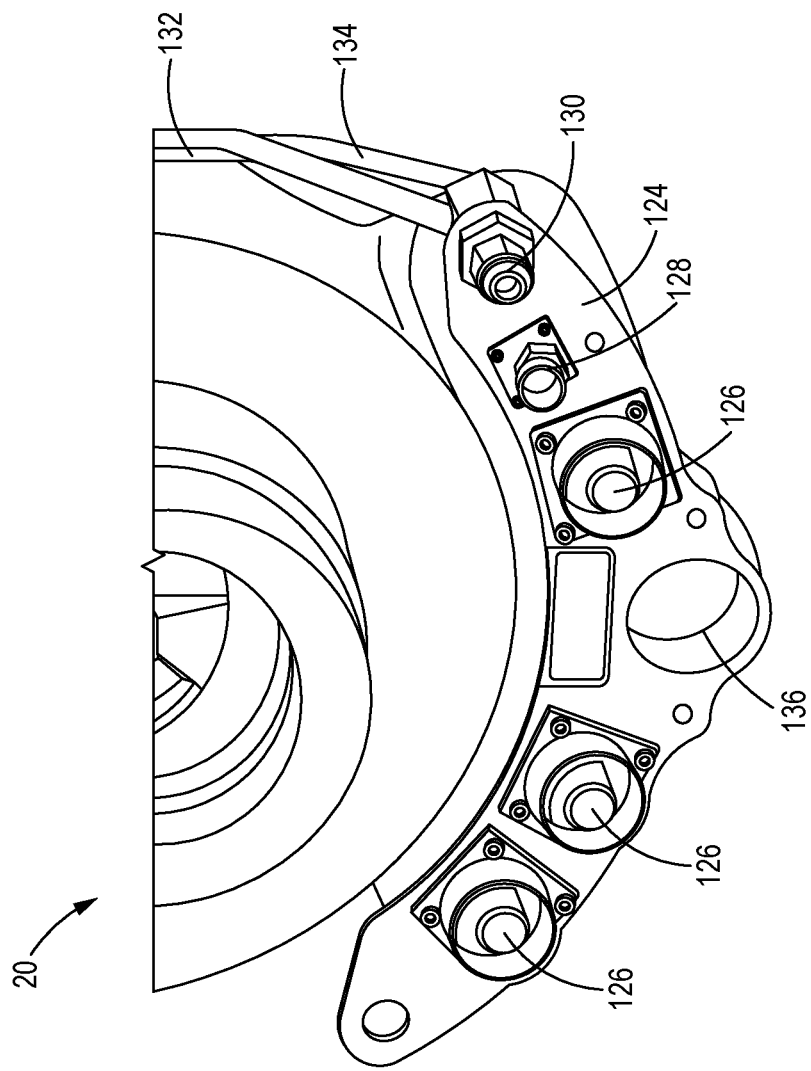
FIG. 8 is a partial assembly isometric view of the turbocharger of FIG. 1 including an interface bulkhead in accordance with the present disclosure.

Referring to FIG. 8, an interface bulkhead 124 for the turbocharger 20 is illustrated. The interface bulkhead 124 includes a variety of connections and interface points which are arranged in a single location on the turbocharger 20. Furthermore, the interface bulkhead 124 simplifies assembly and maintenance operations because fluid connections, electrical connections and other interface points are located at a single, common location. Additionally, the interface bulkhead 124 is configured to allow adequate service tool clearance to access the connection and interface points. As a result, the simplified arrangement of the connection and interface points on the interface bulkhead 124 improves reliability of the turbocharger 20 because the number of external joints and connections is minimized.

In an embodiment, a plurality of electrical connectors 126 are arranged on the interface bulkhead 124 to provide electrical input and/or output to the turbocharger 20 and the electric machine 50 (FIG. 1). As shown, the plurality of electrical connectors 126 are configured to support a 3-phase electric system; however it will be understood the electrical connectors 126 and interface bulkhead 124 can be configured for other electric systems. Additionally, the interface bulkhead 124 includes an auxiliary connector 128 which provides an input and/or output point for a variety of sensors, such as but not limited to a temperature sensor, a flow sensor, a fluid clarity sensor or other such sensor. Moreover, a common fluid inlet 130 is located on the interface bulkhead 124 to supply fluid to a lubrication fluid circuit 132 and a cooling fluid circuit 134 which are each configured to deliver fluid to various points of the turbocharger 20. As discussed above, the bearings 46, 48 and electric machine 50 (FIG. 1) require fluid (i.e., oil) for lubrication and/or cooling during turbocharger 20 operation. The lubrication fluid circuit 132 is configured to receive fluid from a common source (i.e., fluid sump; not shown) and transport the fluid to the bearings 46, 48 (FIG. 1) and other components which need lubricating. Additionally, the cooling fluid circuit 134 is configured to receive fluid from the same common fluid source and transport the fluid to the electric machine 50 (FIG. 1) and other such components which need cooling. Finally, the interface bulkhead 124 includes a fluid drain 136 which collects fluid delivered to various components of the turbocharger 20 by the lubrication and cooling fluid circuits 132, 134. The fluid drain 136 returns the fluid back to the common fluid source (i.e., fluid sump; not shown) such that the fluid may be re-circulated through the lubrication and cooling fluid circuits 132, 134, as needed. It will be understood that interface bulkhead 124 includes one non-limiting arrangement of electrical and fluid inputs/outputs shown. Additional utility connections can be added to the interface bulkhead 124 to support the operational requirements of the turbocharger 20, as needed.

INDUSTRIAL APPLICABILITY

During normal use of the turbocharger 20, exhaust gases from the engine act on the turbine portion 22 to rotate the turbine wheel 34, the rotatable shaft 36, the compressor wheel 38 and the electric machine 50 about the turbocharger longitudinal and rotational axis A-A. As the turbocharger 20 operates, pressurized fluid (i.e., oil) circulates through one or more fluid passages 60 within the turbocharger 20. During operation, rotating components (e.g., turbine wheel 34, rotatable shaft 36, compressor wheel 38 and electromagnetic rotor 52) experience high rotation rates up to 100,000 rpm and the pressurized fluid lubricates the bearings 46, 48, which are operably engaged with the rotatable shaft 36. In an embodiment, the electromagnetic rotor 52 is rotatably coupled to the rotatable shaft 36 and positioned between and in close proximity to the bearings 46, 48. As a result, ingress of lubricating fluid from the bearings 46, 48 into the vicinity of the electromagnetic rotor 52 may occur due to the close proximity of the bearings 46, 48 and the electromagnetic rotor 52. Moreover, the operational efficiency of the electric machine 50 will be negatively influenced because of fluid infiltration into the vicinity of the electromagnetic rotor 52, and more specifically the air gap 62 between the electromagnetic rotor 52 and the stator 54.

Excess fluid within the air gap 62 can become overheated by the elevated temperature within the electric machine 50. Over time, overheated fluid can deposit particulate contaminants (e.g., coked oil) on the rotatable shaft 36, the electromagnetic rotor 52 and stator 54 which can lead to mechanical efficiency loss and decrease in operational life of the electric machine 50. As such, an embodiment of the turbocharger 20 includes the fluid barrier 64 between the bearings 46, 48 and the electromagnetic rotor 52 which adds additional protection to fluid ingress into the electric machine 50. In one non-limiting example, the seal mount 66 is integrated with the rotatable shaft 36 and a sealing element 68 mounted on the seal mount 66 creates a fluid tight seal between the bearings 46, 48 and the electromagnetic rotor 52. Alternatively, the seal mount 66 is a separate component from the rotatable shaft 36 that slides onto the rotatable shaft 36 on either side of the electromagnetic rotor 52 and is fixedly attached using a clearance fit, an interference fit or other such attachment technique.

Furthermore, fluid circulated throughout the turbocharger 20 can be used for cooling components such as the electric machine 50 and other heat generating components. For example, the stator cooling sleeve 56 is configured to slide over and positioned in thermal contact with the outer surface of the stator 54 to aid in conducting heat away from the stator 54. The stator cooling sleeve 56 includes open ends 74, 76 at each axial end of the stator 54. Furthermore, one or more cooling fins 78 extend radially from the stator cooling sleeve 56 surface and wind or otherwise wrap around the stator cooling sleeve 56. In one non-limiting example, the one or more cooling fins 78 are arranged in a helical or corkscrew pattern to define a cooling fluid pathway 82 which travels around the outer surface of the stator cooling sleeve 56. Some of the fluid circulated through the turbocharger can be diverted from the fluid passage 60 before it reaches the bearings 46, 48. Instead, some of the fluid is circulated through the cooling fluid pathway 82 to help cool or otherwise regulate the operational temperature of the stator 54 and electric machine 50. The fluid may flow from one end 74 to the opposite end 76 of the stator cooling sleeve 56 at which point the fluid trickles down through the electric machine housing 32 into a fluid sump (not shown) or other fluid collection area of the turbocharger. Moreover, the fluid sump (not shown) may be a common collection area for both fluid diverted to the stator cooling sleeve 56 and fluid transported to the bearings 46, 48.

In an alternative embodiment, stator cooling sleeve 88 is placed in thermal communication with the outer surface of the stator 54. Stator cooling sleeve 88 has one open end 90 and one closed end 92 that wraps around an end of the electric machine 50 to form an actively cooled axial heat dam between the electric machine 50 and other components of the turbocharger 20. In one embodiment, the closed end 92 wraps around the end of the electric machine adjacent to the turbine portion 22 is help isolate the electric machine from heat generated by the rotating turbine wheel 34. Excessive heat transfer from the turbine portion 22 to the electric machine portion 26 may degrade performance of the electric machine 50. As a result, cooling provided by the closed end 92 of the stator cooling sleeve 88 may allow higher operational temperature in the turbine portion 22 while minimizing concerns of thermal breakdown of insulation on the stator 54, magnets of the electromagnetic rotor 52 and other electric machine 50 components. However, the closed end 92 can also be oriented adjacent to the compressor portion 24 to provide active cooling between the electric machine 50 and compressor wheel 38. As such, stator cooling sleeve 88 has one or more cooling fins 94 which wrap around the outer longitudinal surface of the stator cooling sleeve 88 as well as the outer surface of the closed end 92. Therefore, cooling fluid pathway 96 transports fluid around the stator cooling sleeve 88 to conduct heat away from the stator 54 as well as around the closed end 92 to isolate the electric machine 50 from heat generated by the turbine portion 22, compressor portion 24, or other turbocharger 20 portion.

Alternatively or in addition to stator cooling sleeve 56, one or more fluid jets 84 may be defined at open end 76 of the stator cooling sleeve 56. As noted above, fluid flows through the cooling fluid pathway 82 from one end 74 to the opposite end 76 of the stator cooling sleeve 56. At open end 76, the fluid is expelled through the one or more fluid jets 84 and directed to the wall 86 of electric machine housing 32 that is adjacent to the turbine housing 28. The fluid coats and flows down the wall 86 to cool and minimize heat transfer between the turbine portion 22 and electric machine portion 26. The one or more fluid jets 84 may be sized to direct an amount of fluid onto the wall 86 to produce a desired amount of cooling. Furthermore, the one or more fluid jets 84 may be sized to control fluid flow through the cooling fluid pathway 82 of the stator cooling sleeve 56 and the one or more fluid jets 84 may serve as the main fluid exit from the cooling fluid pathway 82. It will be understood that the one or more fluid jets 84 are not restricted to directing fluid on the electric machine housing 32 wall adjacent to the turbine portion 22 of the turbocharger 20. As a result, the one or more fluid jets 84 and cooling fluid pathway 82 may be arranged on the stator cooling sleeve 56 to direct fluid onto the electric machine housing 32 wall adjacent to the compressor portion 24 or other turbocharger 20 portion.

As noted above, the bearings 46, 48 are adjacently positioned on either side of the electromagnetic rotor 52 and fluid circulated to lubricate the bearings 46, 48 can find its way inside the rotor cavity 116 and/or air gap 62 of the electric machine 50. In an embodiment, the stator 112 is encapsulated or otherwise potted with potting material 114 that fills in slots 118 of the stator 112. Left unfilled, the slots 118 define an ingress point for external fluid to enter into the rotor cavity 116 and/or air gap 62. Fluid that becomes trapped within the electric machine 108 can negatively influence operational performance due to fluid heating and generation of high shear forces that dynamically affect the electromagnetic rotor 110. As such, the potting material 114 can be molded or otherwise formed to define one or more stator channels 120 within the stator 112 that allows fluid to drain from the rotor cavity 116. Additionally, a fluid feed tube 122 can be inserted into one or more of the stator channels 120 to transport fluid within the rotor cavity 116 to the bearings 46, 48.

In yet another embodiment, the electric machine 50 includes an electric machine sleeve 106 having one or more fluid jets 98 arranged to spray or otherwise deliver fluid to stator end turns 100 of the stator 54. Generally, the stator 54 is un-encapsulated or otherwise coated with potting material 114 and fluid sprayed by the jets 98 helps cool the stator end turns 100. The jets 98 receive fluid from the common fluid plenum 102 that also supplies fluid to the bearing feed 104, for lubricating bearings 46, 48.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A lubrication and cooling system for an electric machine operably driven by a turbine, the lubrication and cooling system comprising:
   an electric machine housing defining an enclosure for the electric machine;
   a rotatable shaft extending through the electric machine housing along an axis (A-A);
   a first bearing and a second bearing operably spaced apart from each other and coupled to the rotatable shaft;
   an electromagnetic rotor coupled to the rotatable shaft and disposed between the first bearing and the second bearing;
   a stator fixedly attached within the electric machine housing and circumferentially surrounding the electromagnetic rotor such that the electromagnetic rotor freely rotates along with the rotatable shaft;
   a fluid passage defined within the electric machine housing and fluidly coupled to a fluid inlet, wherein a fluid flows through the fluid passage and a portion of the fluid is directed to a first portion of the electric machine housing to lubricate the first bearing and the second bearing, and wherein a remaining portion of the fluid is directed into a second portion of the electric machine housing, the remaining portion of fluid circumferentially flows around the stator such that the fluid is in thermal communication with an outside surface the stator to help maintain a desired operating temperature of the electric machine.

2. The lubrication and cooling system of claim 1, comprising a stator cooling sleeve in thermal communication with and circumferentially surrounding an outer surface of the stator, wherein the stator cooling sleeve includes one or more cooling fins extending away from a sleeve outer surface to define a cooling fluid pathway, and wherein the portion of the fluid directed into the second portion of the electric machine housing flows through the cooling fluid pathway to conduct heat away from the stator.

3. The lubrication and cooling system of claim 2, wherein the one or more cooling fins are arranged in a cork-screw pattern and the cooling fluid pathway defines a helical channel for the fluid to flow around the stator cooling sleeve.

4. The lubrication and cooling system of claim 3, comprising one or more fluid jets extending through an end portion of the stator cooling sleeve adjacent to the turbine, wherein the fluid enters the cooling fluid pathway at an opposite end portion of the stator cooling sleeve and flows through the helical channel towards the one or more fluid jets, and wherein the one or more fluid jets direct the fluid towards a wall of the electric machine housing that is adjacent to the turbine to help cool the electric machine housing.

5. The lubrication and cooling system of claim 3, wherein a closed end is formed at an end portion of the stator cooling sleeve, the closed end is in thermal communication to a wall of the electric machine housing adjacent to the turbine, and wherein the cooling fluid pathway continues onto the closed end to help cool the wall of the electric machine housing.

6. The lubrication and cooling system of claim 1, comprising a first seal mount disposed between a first end of the electromagnetic rotor and the first bearing and a second seal mount disposed between a second end of the electromagnetic rotor and the second bearing, wherein the first and second seal mounts each define a seal mounting portion which accepts a sealing element that forms a fluid tight seal between the first and second bearings and the electromagnetic rotor of the electric machine.

7. The lubrication and cooling system of claim 6, wherein the first and second seal mounts are integrally formed with the rotatable shaft resulting in a unitary structure.

8. The lubrication and cooling system of claim 6, wherein the first and second seal mounts are slidably positioned onto the rotatable shaft such that the first and second seal mounts are coupled to the rotatable shaft using one of a clearance fit or interference fit.

9. The lubrication and cooling system of claim 1, wherein the stator includes one or more slots that are encapsulated with a potting material and one or more stator channels are molded into the potting material within the one or more slots, and wherein fluid trapped in a rotor cavity of the electric machine is drained from the rotor cavity through the one or more stator channels.

10. The lubrication and cooling system of claim 9, wherein a fluid feed tube is inserted and extends along the stator, wherein the fluid feed tube is in fluid communication with the first and second bearings, and wherein fluid is transported through the fluid feed tube to lubricate the first and second bearings.

11. An electric machine operably coupled to a turbocharger the electric machine comprising:
an electromagnetic rotor operably coupled to a rotatable shaft, the rotatable shaft being driven by a turbine of the turbocharger;
a stator circumferentially surrounding the electromagnetic rotor such that the electromagnetic rotor freely rotates along with the rotatable shaft;
a first bearing and a second bearing operably spaced apart from each other and coupled to the rotatable shaft, the electromagnetic rotor and the stator disposed between the first bearing and the second bearing;
an electric machine housing defining an enclosure for the electromagnetic rotor and the stator and the electric machine housing adjacently arranged to the turbine and a compressor of the turbocharger; and
a lubrication and cooling system for the electric machine comprising:
a stator cooling sleeve circumferentially surrounding and in thermal communication with an outer surface of the stator, and
a fluid passage defined within the electric machine housing and fluidly coupled to a fluid inlet, wherein a fluid flows through the fluid passage and a portion of the fluid is directed towards a first portion of the electric machine housing to lubricate the first and second bearings, and wherein a remaining portion of the fluid is directed towards a second portion of the electric machine housing such that the remaining portion of the fluid circumferentially flows around the stator cooling sleeve to help maintain a desired temperature of the stator during operation of the electric machine.

12. The electric machine of claim 11, wherein the stator cooling sleeve includes one or more cooling fins extending away from a sleeve outer surface to define a cooling fluid pathway, wherein the one or more cooling fins are arranged in a cork-screw pattern such that the cooling fluid pathway defines a helical channel and wherein the portion of fluid directed towards the second portion of the electric machine housing flows through the helical channel to conduct heat away from the stator.

13. The electric machine of claim 12, comprising one or more fluid, ets extending through an end portion of the stator cooling sleeve, wherein the fluid enters the cooling fluid pathway at an opposing end portion of the stator cooling sleeve and flows through the helical channel towards the one or more fluid jets, and wherein the one or more fluid jets direct the fluid towards a wall of the electric machine housing.

14. The electric machine of claim 12, wherein a closed end is formed at an end portion of the stator cooling sleeve and the end portion includes the one or more cooling fins to further define the cooling fluid pathway along the closed end, and wherein the fluid flows around cooling fluid pathway along the closed end to provide cooling to a wall of the electric machine housing.

15. The electric machine of claim 11, comprising a first seal mount disposed between a first end of the electromagnetic rotor and the first bearing and a second seal mount disposed between a second end of the electromagnetic rotor and the second bearing, wherein the first and second seal mounts each define a seal mounting portion which accepts a sealing element that forms a fluid tight seal between the first and second bearings and the electromagnetic rotor of the electric machine.

16. The electric machine of claim 11, wherein the stator includes one or more slots that are encapsulated with a potting material and one or more stator channels are molded into the potting material within the one or more slots, and wherein fluid trapped in a rotor cavity of the electric machine is drained from the rotor cavity through the one or more stator channels.

17. A turbocharger for receiving exhaust gas from an internal combustion engine and for delivering compressed air to the internal combustion engine and driving an electric machine, the turbocharger being lubricated and cooled by a common fluid source, the turbocharger comprising:
a turbine housing defining an enclosure for a turbine wheel;
an electric machine housing coupled to the turbine housing and defining an enclosure for an electric machine that includes an electromagnetic rotor and a stator;
a rotatable shaft extending through the turbine housing and the electric machine housing, the turbine wheel and the electromagnetic rotor operably coupled to the rotatable shaft and aligned along an axis (A-A) such that rotation of the turbine wheel coincidently drives rotation of the electromagnetic rotor;

a first bearing and a second bearing operably spaced apart from each other and coupled to the rotatable shaft, the electromagnetic rotor and the stator disposed between the first bearing and the second bearing;

a stator cooling sleeve circumferentially surrounding and in thermal communication with an outer surface of the stator; and a fluid passage defined within the electric machine housing and fluidly coupled to a fluid inlet which receives a fluid from the common fluid source, wherein the fluid flows through the fluid passage and a portion of the fluid is directed to a first portion of the electric machine housing to lubricate the first and second bearings, and wherein a remaining portion of the fluid is directed into a second portion of the electric machine housing and flows around the stator cooling sleeve to help maintain a desired temperature during operation of the electric machine.

18. The turbocharger of claim 17, wherein the stator cooling sleeve includes one or more cooling fins extending away from a sleeve outer surface to define a cooling fluid pathway, wherein the one or more cooling fins are arranged ins a cork-screw pattern such that the cooling fluid pathway defines a helical channel around the stator cooling sleeve, and wherein the portion of fluid directed towards the second portion of the electric machine housing flows through the helical channel to conduct heat away from the stator.

19. The turbocharger of claim 17, comprising a first seal mount disposed between a first end of the electromagnetic rotor and the first bearing and a second seal mount disposed between a second end of the electromagnetic rotor and the second bearing, wherein the first and second seal mounts each define a seal mounting portion which accepts a sealing element that forms a fluid tight seal between the first and second bearings and the electromagnetic rotor.

20. The turbocharger of claim 17, wherein the stator includes one or more slots that are encapsulated with a potting material and one or more stator channels are molded into the potting material within the one or more slots, and wherein fluid trapped in a rotor cavity of the electric machine is drained through the one or more stator channels.

* * * * *